United States Patent Office 2,918,497
Patented Dec. 22, 1959

2,918,497

PRODUCTION OF PHENOXYACETALDEHYDE

Charles R. Walter, Jr., Hopewell, Va., assignor to Allied Chemical Corporation, a corporation of New York No Drawing. Application December 23, 1957
Serial No. 704,363

3 Claims. (Cl. 260—600)

This invention relates to the production of phenoxyacetaldehyde. More particularly, the invention relates to the production of phenoxyacetaldehyde by vapor phase oxidation of phenoxyethanol in the presence of silver metal catalysts.

According to known procedures for producing aldehydes by oxidizing aliphatic glycol ethers in the presence of silver metal catalysts, elevated temperatures in the order of about 400° C. or higher were employed. However, when these procedures were applied to the oxidation of phenoxyethanol, no yields of phenoxyacetaldehyde were obtained.

The object of the present invention is to provide an economical and efficient process for the production of phenoxyacetaldehyde by vapor phase oxidation of phenoxyethanol in the presence of silver metal catalysts. Other objects of the invention will appear hereinafter.

According to the present invention, phenoxyacetaldehyde is produced in high yield and efficiency by passing a vaporous mixture of phenoxyethanol and excess molecular oxygen-containing gas into contact with a supported silver metal catalyst maintained at a temperature within the range of about 225° to 275° C., and separately recovering the phenoxyacetaldehyde so produced.

The oxidation of phenoxyethanol to phenoxyacetaldehyde may be represented by the following equation:

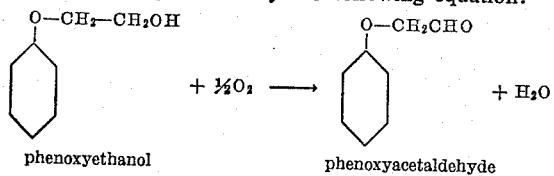

phenoxyethanol     phenoxyacetaldehyde

The catalytic temperature of the process of this invention must not exceed 275° C. When higher temperatures are employed, little or no yield of phenoxyacetaldehyde product is obtained. Further, it has been found that when temperatures below about 225° C. are employed, unacceptably low product yields are obtained. Optimum yields and efficiencies are realized upon use of temperatures within the range of about 250° to 275° C.

The catalyst employed in the process of the present invention comprises silver metal deposited on a suitable inert support. Although an Alundum support has been found to be extremely effective in catalyzing the reaction of this invention to produce high yields and efficiencies, other supports such as alumina, silicon carbide, clay, pumice, etc. may also be employed. The supported catalyst usually contains about 5 to 30% by weight, and preferably about 10 to 20%, by weight of silver metal.

If desired, a suitable promoter, e.g., an organic salt of an alkali metal or alkaline earth metal may be incorporated in the catalyst. Examples of these promoters include barium lactate, barium acetate, calcium acetate, strontium salicylate, lithium citrate, etc.

Although any molecular oxygen-containing gas may be used as the oxidizing agent of the present process, it is preferred that air or an oxygen-containing gas substantially equivalent thereto be employed. The oxygen-containing gas should be employed in amount such that its oxygen content is several times the amount theoretically required to convert all of the phenoxyethanol to phenoxyacetaldehyde. Particularly outstanding results have been obtained by employing a vaporous mixture comprising phenoxyethanol and air containing about 0.3 to 5, and preferably about 0.5 to 2, volume percent of phenoxyethanol. Phenoxyethanol concentrations in substantial excess of 5% were found to produce excessive heat in the system, thereby effecting decomposition reactions and decreased yields and efficiencies. Although concentrations below about 0.3% are operable, they are uneconomical.

Suitable space velocities, i.e., volumes of gaseous reactants per volume of catalyst per hour, range from 10,000 to 19,000. Optimum yields and efficiencies are obtained by employing a space velocity within the range of about 14,000 to 17,000.

According to a preferred method of carrying out the process of the present invention, phenoxyethanol is mixed with an excess of air at a temperature of about 120° to 140° C. to produce a vaporous mixture containing about 0.5 to 2 volume percent of phenoxyethanol. The vaporous mixture is then passed to a suitable catalyst-filled reactor at a space velocity of about 14,000 to 17,000. In the reactor, the vaporous mixture contacts the catalyst comprising supported silver metal maintained at a temperature of about 250° to 275° C. The gaseous reaction product emerging from the reactor is condensed to produce crude phenoxyacetaldehyde. The crude phenoxyacetaldehyde may then be treated by conventional purification procedures, e.g., by extraction with xylene, followed by distillation, to separate phenoxyacetaldehyde from unreacted phenoxyethanol and other by-products. The unreacted phenoxyethanol so recovered may be returned to the reactor as partial charge.

In employing the operating conditions set forth above, yields of phenoxyacetaldehyde ranging from about 30 to 40% and efficiencies ranging from about 70 to 100% have been obtained. Yield is computed by multiplying the ratio of mols of phenoxyacetaldehyde formed to mols of phenoxyethanol fed by 100. Efficiency is computed by multiplying the ratio of mols of phenoxyacetaldehyde formed to mols of unrecovered phenoxyethanol by 100.

The following example, in which parts are by weight, illustrates one way of carrying out the present invention.

*Example*

A stainless steel reactor, surrounded by a heating jacket filled with Dowtherm A (a heat transfer medium, comprising 73.5% diphenyl oxide and 26.5% diphenyl) and provided with a reflux condenser leading into the heating jacket for the condensation of heat transfer fluid vapors, was filled with about 35 parts of a catalyst comprising silver on Alundum maintained at a temperature of 250° C.

The catalyst was prepared by slowly adding to 14.3 parts of sodium hydroxide in about 286 parts of water, with stirring, 54.4 parts of silver nitrate is an equal volume of water. A precipitate of silver oxide formed. The precipitate was allowed to settle and was then washed ten times with warm water, about 250 parts of warm water (50° C.) being used each time. The water was decanted after each wash. A promoter was prepared by combining 6.4 parts of barium hydroxide

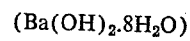

with 4.4 parts of 85% lactic acid, and the resulting solution was added to the silver oxide slurry. The final mixture was used to impregnate 200 parts of 8–10 mesh Alundum which was then heated with stirring to a temperature of about 85° C. until almost dry. The catalyst was dried at 100° to 110° C. overnight, and finally was activated by heating at 400° C. for one hour. This heat treatment converted the silver oxide to metallic silver, as well as at least part of the barium lactate to carbonate or carbonate complex. The final catalyst comprised silver metal (12% by weight), Alundum (86% by weight) and barium compound (2% by weight—calculated as barium carbonate ($BaCO_3$)).

Compressed air, dried over calcium chloride, was passed at the rate of 7.35 parts per minute into the bottom of a column of phenoxyethanol maintained in a vessel at 123° C. The resultant air-alcohol mixture, containing about 1% by volume of phenoxyethanol, was fed to the reactor at a space velocity of 15,280.

The gaseous product emerging from the reactor was passed through two cold traps, the first maintained at a temperature of 0° C. and the second at −40° C., and then through a xylene scrubber in countercurrent relationship to the xylene. At the end of 6½ hours, the contents of the traps and scrubber were combined. The water present was separated by decantation, and the xylene removed by distillation at 100° C. under pressure of 25 mm. Hg. 51.1 parts of phenoxyacetaldehyde and 112.2 parts of unreacted phenoxyethanol were recovered from a total of 165.9 parts of phenoxyethanol fed to the reactor. This represented a yield of 30.8% based on the total feed and an efficiency of 95% based on unrecovered phenoxyethanol.

Phenoxyacetaldehyde finds utility in the production of 2,4-dichlorophenoxyacetic acid, one of the largest selling organic herbicides in use today. In the production of this herbicide, phenoxyacetaldehyde is first oxidized to phenoxyacetic acid, and the phenoxyacetic acid is then chlorinated to form 2,4-dichlorophenoxyacetic acid.

It will be understood that many variations can be made in the present process and that it is not to be limited by the details given, except as indicated in the appended claims.

I claim:

1. A process for the production of phenoxyacetaldehyde which comprises passing a vaporous mixture of phenoxyethanol and excess molecular oxygen-containing gas into contact with a catalyst comprising silver metal supported on a material selected from the group consisting of Alundum, alumina, silicon carbide, clay and pumice, said catalyst being maintained at a temperature of about 225° to 275° C., and separately recovering the phenoxyacetaldehyde so produced.

2. A process for the production of phenoxyacetaldehyde which comprises passing a vaporous mixture of phenoxyethanol and excess air, said mixture containing about 0.3 to 5 volume percent of phenoxyethanol, into contact with a catalyst comprising silver metal supported on Alundum, said catalyst being maintained at a temperature of about 225° to 275° C., and separately recovering the phenoxyacetaldehyde so produced.

3. A process for the production of phenoxyacetaldehyde which comprises passing a vaporous mixture of phenoxyethanol and excess air, said mixture containing about 0.5 to 2 volume percent of phenoxyethanol, into contact with a catalyst comprising silver metal supported on Alundum, said catalyst being maintained at a temperature of about 250° to 275° C., and separately recovering the phenoxytcetaldehyde so produced.

References Cited in the file of this patent
UNITED STATES PATENTS 2,307,934    Loder et al. _____ Jan. 12, 1943